(No Model.)

W. MORRISON & L. SCHMIDT.
METHOD OF MAKING STORAGE BATTERY PLATES.

No. 439,416. Patented Oct. 28, 1890.

Witnesses:
R. H. Orwig.
Leander Pelton.

Inventors: William Morrison,
Louis Schmidt,
By Thomas G. Orwig, Atty.

UNITED STATES PATENT OFFICE.

WILLIAM MORRISON AND LOUIS SCHMIDT, OF DES MOINES, IOWA, ASSIGNORS TO THE HESS ELECTRIC STORAGE BATTERY COMPANY, OF SAME PLACE.

METHOD OF MAKING STORAGE-BATTERY PLATES.

SPECIFICATION forming part of Letters Patent No. 439,416, dated October 28, 1890.

Application filed December 23, 1889. Serial No. 334,739. (No model.)

*To all whom it may concern:*

Be it known that we, WILLIAM MORRISON and LOUIS SCHMIDT, citizens of the United States of America, and residents of Des Moines, in the county of Polk and State of Iowa, have invented a new and useful Method of Making Plates for Storage or Secondary Batteries, of which the following is a specification.

Heretofore granulated soluble substances have been placed in a mold and lead then cast around the particles to produce a solid plate, that was subsequently made cellular and porous by dissolving and removing the soluble matter and then filling the cells thus produced with an active material by pneumatic pressure.

Our object is to reduce the cost and labor of making storage-plates and secondary batteries and to improve their efficiency; and our invention consists in producing a solid active material and a solid plate, as hereinafter set forth, and pointed out in our claim, as required to enable others skilled in the art to which it appertains to practice the method and utilize our invention.

Figure 1:
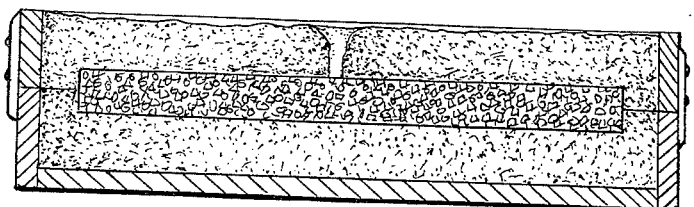
Figure 2:
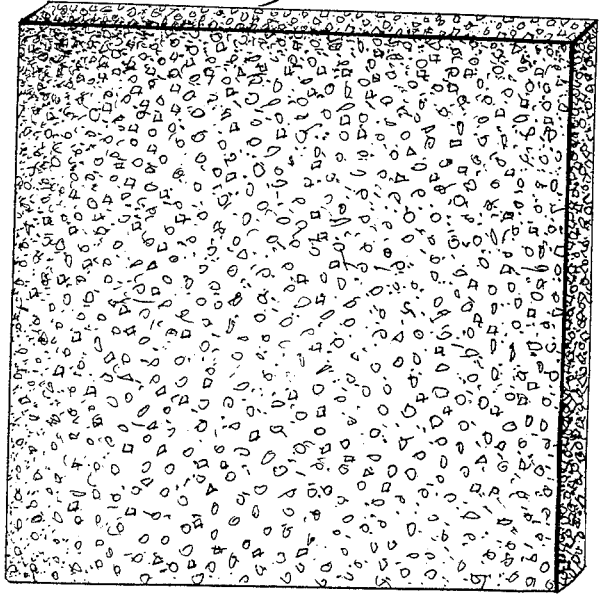

Figure 1 of the accompanying drawings is a sectional view of a flask and mold into which particles of the solid active material have been placed preparatory to pouring in molten lead to produce a solid plate. Fig. 2 is a perspective view of a plate taken from the mold, showing the particles of active material projecting through the lead.

To produce the active material adapted to be combined with lead to form a solid plate, we add acid, preferably nitric acid, to salt of lead, preferably protoxide of lead, in sufficient quantity to produce a plastic compound. We next dry or bake the plastic material until it is hard, and then break and granulate it; or the plastic matter may be formed into plates or small lumps of various shapes and sizes and then dried or baked hard to avoid breaking and granulating.

To make a complete storage-plate, we put in a suitable mold pieces or particles of hard active material, heat the mold to the degree required to melt lead therein, and then pour molten lead into the mold to fill all the vacant interstices between the active matter and the inside surface of the mold, and allow the mold and the matter therein to cool, and when the mold is opened and the plate removed it will be ready for sale and use, and its entire surface will conform in shape with the mold in which it was made. It is therefore obvious that a plate filled with an active material that is exposed on all parts of the surface of the plate can be advantageously produced by the practice of our method.

We are aware that a paste and cement have been made by mixing protoxides of lead and sulphuric acid with other adhesive matter. We are also aware that pieces of cohesive active material have been placed in a mold, molten lead then poured in to fill the interstices, and the block thus produced then cut into plates to be used as electrodes in batteries; but an active material composed of protoxide of lead and nitric acid, by first making a plastic material and then making it hard by baking or drying before placing it in the mold and heating the mold before pouring molten lead therein, produces a complete solid finished plate in which the active material, on account of the chemical action of the acid upon the protoxide of lead and the lead, is more firmly united, and consequently a more compact and durable plate is produced than when no acid is used in mixing and preparing the active material and the active material placed in a mold large enough to produce a large casting that is subsequently cut into a number of plates. We therefore do not claim that it is new to place pieces of active material into a mold and then pouring molten lead around the pieces; but

We claim as our invention—

The herein-described method of making a plate for a secondary battery, which mode or method consists in first mixing nitric acid and protoxide of lead to produce a plastic composition, then drying or baking the composition to make it hard, then filling a mold with the hard active matter particles, then heating the mold, then pouring molten lead into the mold and filling the vacant interstices with the lead, and allowing the mold and material therein to cool before removing the plate from the mold.

WILLIAM MORRISON.
LOUIS SCHMIDT.

Witnesses:
H. K. HESS,
THOMAS G. ORWIG.